US009714712B2

(12) United States Patent
Kiernan

(10) Patent No.: US 9,714,712 B2
(45) Date of Patent: Jul. 25, 2017

(54) HYDRODYNAMIC MATING RING WITH INTEGRATED GROOVE INLET PRESSURE CONTROL

(71) Applicant: EATON CORPORATION, Cleveland, OH (US)

(72) Inventor: Gregory Thomas Kiernan, Exeter, RI (US)

(73) Assignee: Eaton Corporation, Cleveland, OH (US)

( * ) Notice: Subject to any disclaimer, the term of this patent is extended or adjusted under 35 U.S.C. 154(b) by 183 days.

(21) Appl. No.: 14/825,656

(22) Filed: Aug. 13, 2015

(65) Prior Publication Data

US 2016/0047476 A1 Feb. 18, 2016

Related U.S. Application Data

(60) Provisional application No. 62/037,720, filed on Aug. 15, 2014.

(51) Int. Cl.
*F16J 15/34* (2006.01)

(52) U.S. Cl.
CPC ......... *F16J 15/3412* (2013.01); *F16J 15/342* (2013.01); *F16J 15/3404* (2013.01); *F16J 15/3408* (2013.01)

(58) Field of Classification Search
CPC .. F16J 15/3404; F16J 15/3408; F16J 15/3412; F16J 15/3416; F16J 15/342
USPC .................................................. 277/400, 401
See application file for complete search history.

(56) References Cited

U.S. PATENT DOCUMENTS

| 1,797,735 | A | 3/1931 | Spreen |
|---|---|---|---|
| 2,843,403 | A | 7/1958 | Stevenson et al. |
| 3,499,653 | A | 3/1970 | Gardner |
| 3,708,177 | A | 1/1973 | Baermann |
| 3,782,737 | A | 1/1974 | Ludwig et al. |
| 3,804,424 | A | 4/1974 | Gardner |
| 3,822,068 | A | 7/1974 | Litherland |
| 3,973,781 | A | 8/1976 | Grörich |
| 4,082,296 | A | 4/1978 | Stein |

(Continued)

FOREIGN PATENT DOCUMENTS

| DE | 8814442 U1 | 3/1990 |
|---|---|---|
| DE | 3901362 | 7/1990 |

(Continued)

*Primary Examiner* — Nicholas L Foster
(74) *Attorney, Agent, or Firm* — Fishman Stewart PLLC

(57) ABSTRACT

A hydrodynamic mating ring of the present disclosure may include a sealing face, a hydrodynamic groove disposed in the sealing face, an impeller portion, and an inlet conduit configured to provide fluid communication between the hydrodynamic groove and the impeller portion. A method of sealing may include providing a mating ring having a sealing face, a plurality of hydrodynamic grooves disposed in the sealing face, a plurality of impeller portions, and a plurality of inlet conduits configured to provide fluid communication between respective ones of the plurality of hydrodynamic grooves and the plurality of impeller portions. The method may include rotating the mating ring, and increasing at least one of a pressure, a volume, and a flow rate of fluid to the hydrodynamic grooves via the plurality of impeller portions drawing said fluid into the plurality of inlet conduits.

20 Claims, 13 Drawing Sheets

(56) References Cited

U.S. PATENT DOCUMENTS

| | | | |
|---|---|---|---|
| 4,145,058 A | 3/1979 | Hady et al. | |
| 4,486,026 A | 12/1984 | Furumura et al. | |
| 4,705,277 A | 11/1987 | Repella | |
| 4,795,168 A | 1/1989 | Adams et al. | |
| 4,887,395 A | 12/1989 | Lebeck et al. | |
| 4,908,081 A | 3/1990 | Heinrich et al. | |
| 4,969,810 A | 11/1990 | Stolle et al. | |
| 4,973,068 A | 11/1990 | Lebeck | |
| 5,078,411 A | 1/1992 | Geco | |
| 5,092,612 A | 3/1992 | Victor et al. | |
| 5,169,159 A | 12/1992 | Pope et al. | |
| 5,174,584 A | 12/1992 | Lahrman | |
| 5,180,173 A | 1/1993 | Kimura et al. | |
| 5,195,757 A | 3/1993 | Dahll, V | |
| 5,222,743 A | 6/1993 | Goldswain et al. | |
| 5,224,714 A | 7/1993 | Kimura et al. | |
| 5,375,853 A | 12/1994 | Wasser et al. | |
| 5,398,943 A | 3/1995 | Shimizu et al. | |
| 5,454,572 A | 10/1995 | Pospisil | |
| 5,492,341 A | 2/1996 | Pecht et al. | |
| 5,496,047 A | 3/1996 | Goldswain et al. | |
| 5,509,664 A | 4/1996 | Borkiewicz | |
| 5,516,118 A | 5/1996 | Jones | |
| 5,529,315 A | 6/1996 | Borrino et al. | |
| 5,558,341 A | 9/1996 | McNickle et al. | |
| 5,577,739 A | 11/1996 | Ciotola | |
| 5,605,339 A | 2/1997 | Pecht et al. | |
| 5,702,110 A | 12/1997 | Sedy | |
| 5,722,665 A | 3/1998 | Sedy et al. | |
| 5,730,447 A | 3/1998 | Dawson et al. | |
| 5,941,532 A | 8/1999 | Flaherty et al. | |
| 5,947,481 A | 9/1999 | Young | |
| 6,089,756 A | 7/2000 | Ono et al. | |
| 6,105,968 A | 8/2000 | Yeh et al. | |
| 6,142,478 A | 11/2000 | Pecht et al. | |
| 6,145,843 A | 11/2000 | Hwang | |
| 6,149,160 A | 11/2000 | Stephens et al. | |
| 6,189,896 B1 | 2/2001 | Dickey et al. | |
| 6,213,473 B1 | 4/2001 | Lebeck | |
| 6,257,589 B1 | 7/2001 | Flaherty et al. | |
| 6,257,859 B1 | 7/2001 | Koda et al. | |
| 6,446,976 B1 | 9/2002 | Key et al. | |
| 6,494,460 B2 * | 12/2002 | Uth | F16J 15/342 277/399 |
| 6,805,358 B2 | 10/2004 | Dawson et al. | |
| 7,004,119 B2 * | 2/2006 | Dardalis | F01B 15/007 123/190.12 |
| 7,044,470 B2 * | 5/2006 | Zheng | F16J 15/3448 277/400 |
| 7,377,518 B2 | 5/2008 | Lai | |
| 7,500,676 B2 | 3/2009 | Tejima | |
| 7,770,898 B2 | 8/2010 | Dietle et al. | |
| 7,914,007 B2 | 3/2011 | Berard et al. | |
| 8,074,995 B2 | 12/2011 | Vasagar et al. | |
| 8,091,898 B2 | 1/2012 | Garrison | |
| 8,100,403 B2 | 1/2012 | Short | |
| 8,162,322 B2 | 4/2012 | Flaherty | |
| 8,474,826 B2 | 7/2013 | Villeneuve et al. | |
| 8,628,092 B2 | 1/2014 | Deo et al. | |
| 8,757,632 B2 | 6/2014 | Dobosz et al. | |
| 9,062,775 B2 | 6/2015 | Short et al. | |
| 2002/0014743 A1 * | 2/2002 | Zheng | F16J 15/342 277/358 |
| 2002/0079648 A1 * | 6/2002 | Uth | F16J 15/342 277/401 |
| 2004/0256809 A1 * | 12/2004 | Dardalis | F01B 15/007 277/399 |
| 2005/0094906 A1 | 5/2005 | Satoh | |
| 2008/0042364 A1 | 2/2008 | Zheng et al. | |
| 2008/0272552 A1 | 11/2008 | Zheng et al. | |
| 2008/0284105 A1 | 11/2008 | Vasagar et al. | |
| 2009/0279817 A1 | 11/2009 | Shimizu et al. | |
| 2009/0297077 A1 | 12/2009 | Nll et al. | |
| 2014/0197600 A1 * | 7/2014 | Hosoe | F16J 15/3412 277/409 |
| 2015/0123350 A1 | 5/2015 | Itadani et al. | |
| 2015/0275684 A1 | 10/2015 | Thatte et al. | |

FOREIGN PATENT DOCUMENTS

| | | |
|---|---|---|
| DE | 29601165 U1 | 3/1996 |
| DE | 19722870 | 9/2000 |
| EP | 0306979 A2 | 3/1989 |
| EP | 0402333 A2 | 12/1990 |
| EP | 0992723 A2 | 4/2000 |
| EP | 1302709 A2 | 4/2003 |
| JP | 0450559 A | 2/1992 |
| JP | 5164249 | 6/1994 |
| WO | 95/06211 A1 | 3/1995 |
| WO | 01/66982 A1 | 9/2001 |
| WO | 02/093046 A1 | 11/2002 |
| WO | 2004/053365 A1 | 6/2004 |

* cited by examiner

HYDRODYNAMIC MATING RING WITH INTEGRATED GROOVE INLET PRESSURE CONTROL

CROSS-REFERENCE TO RELATED APPLICATIONS

This application claims the benefit of U.S. Provisional Application Ser. No. 62/037,720, filed Aug. 15, 2014 the disclosure of which is incorporated herein by reference in its entirety.

BACKGROUND

Technical Field

The present disclosure relates generally to hydrodynamic face seals.

Description of the Related Art

Spiral groove lift-off seals (also known as hydrodynamic seals or hydrodynamic face seals) have been used successfully for many years in the industrial gas compressor industry.

Generally, the seal assembly involves a system fluid pressure (e.g., gas density). The high fluid pressure may be located on either an inside diameter of a seal assembly or the outside diameter of a seal assembly. The seal assemblies may comprise two rings where a face of each ring is adjacent to one another. A first ring may be a stationary member, also known as a seal ring, and may be movable only in an axial direction. A second ring may be a rotational member, also known as a mating ring or rotor, which may rotate about an axis that is generally shared by the two components. The second ring may contain a plurality of grooves on the face adjacent to the first ring. The grooves, which may be spiral in shape, may be grooved toward a low pressure side of the second ring. The grooves may have a dam section where the groove ends. A sealing effect around the dead ended grooves can provide a compression of a working fluid, such as gas, resulting in a pressure increase in the groove region. The increase in pressure can cause the faces to separate slightly, which can allow the pressured fluid, such as air, to escape the grooves. A steady state force balance between opening and closing forces may be generally achieved at some determinable face separation gap. The seal may operate in a non-contact mode above some threshold rotational speed.

However, when employing conventional hydrodynamic groove technology for the purpose of producing a film riding seal (e.g., non-contacting) in or under certain conditions, such as the outside environment of an aircraft at cruising altitude, the ability for a sufficient amount of fluid to enter the hydrodynamic grooves may be diminished due to a lower speed, lower density, and/or a rarefaction of the fluid. The resulting hydrodynamic fluid film between the rotating mating ring and the stationary seal ring can be significantly reduced. Thin hydrodynamic fluid films may be less stable than desired and may result in higher heat generation due, for example, to intermittent contact from transient conditions and high vicious shear of the fluid.

Among other things, the present disclosure addresses one or more of the aforementioned challenges.

SUMMARY

In embodiments, a hydrodynamic mating ring may include a sealing face, a hydrodynamic groove disposed in the sealing face, an impeller portion, and/or an inlet conduit that may be configured to provide fluid communication between the hydrodynamic groove and the impeller portion. The mating ring may include a buffer that may be disposed beneath the sealing face and may be in fluid communication with the impeller portion and/or the inlet conduit.

In embodiments, a method of sealing may include providing a mating ring that may include a sealing face, a plurality of hydrodynamic grooves disposed in the sealing face, a plurality of impeller portions, and/or a plurality of inlet conduits that may be configured to provide fluid communication between respective ones of the plurality of hydrodynamic grooves and the plurality of impeller portions. The method may include rotating the mating ring, and increasing at least one of a pressure, a volume, and a flow rate of fluid to the hydrodynamic grooves via the plurality of impeller portions drawing said fluid into the plurality of inlet conduits.

BRIEF DESCRIPTION OF THE DRAWINGS

The present invention will now be described, by way of example, with reference to the accompanying drawings, wherein like reference numerals identify like components in the several figures, in which.

DETAILED DESCRIPTION

Reference will now be made in detail to embodiments of the present disclosure, examples of which are described herein and illustrated in the accompanying drawings. While the disclosed concepts will be described in conjunction with embodiments, it will be understood that they are not intended to limit the disclosure to these embodiments. On the contrary, the disclosure is intended to cover alternatives, modifications and equivalents, which may be included within the spirit and scope as defined by the appended claims.

Figure 1:
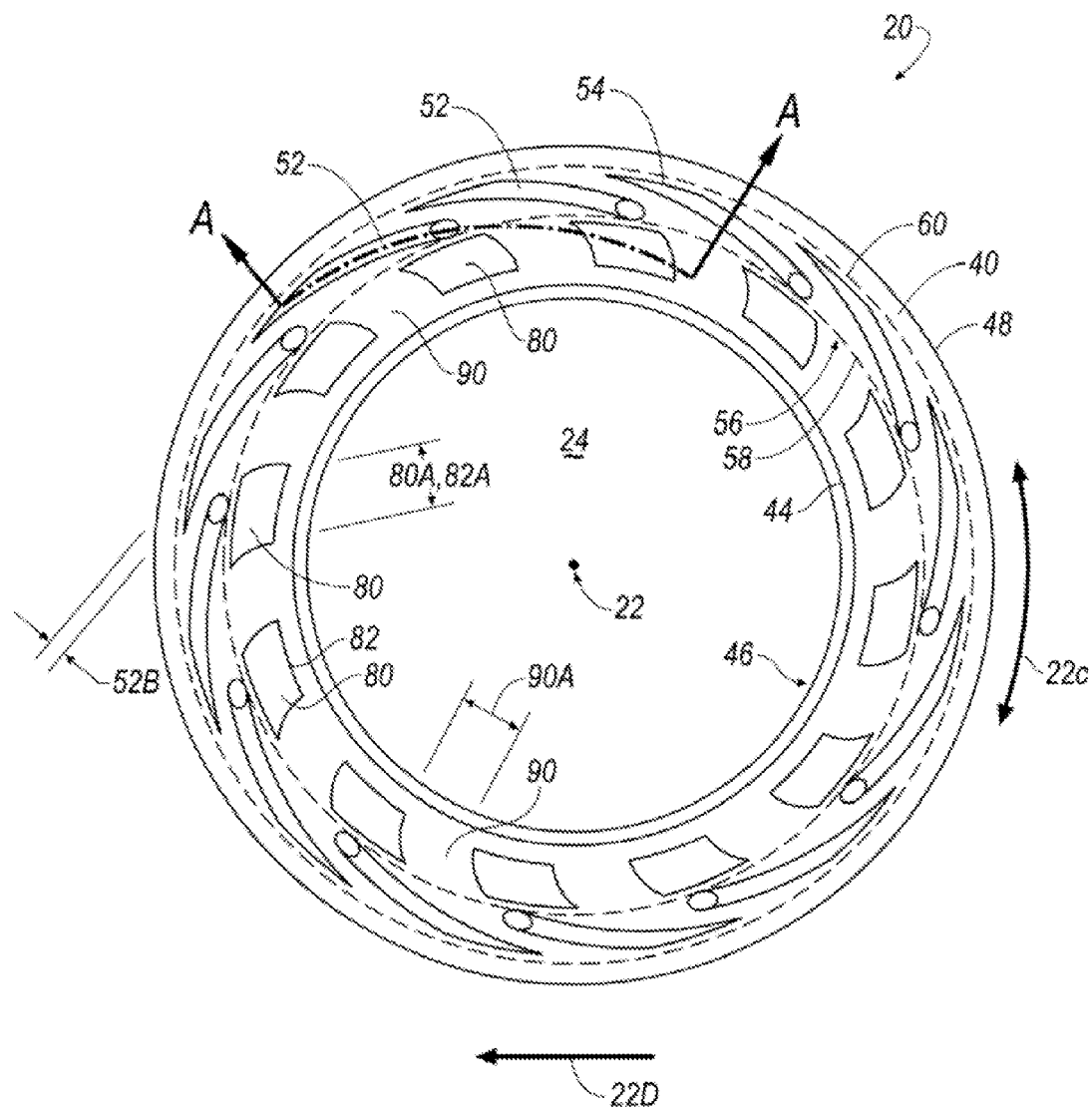
FIG. 1 is a front view of an embodiment of a mating ring embodying teachings of the present disclosure.
Figure 2:
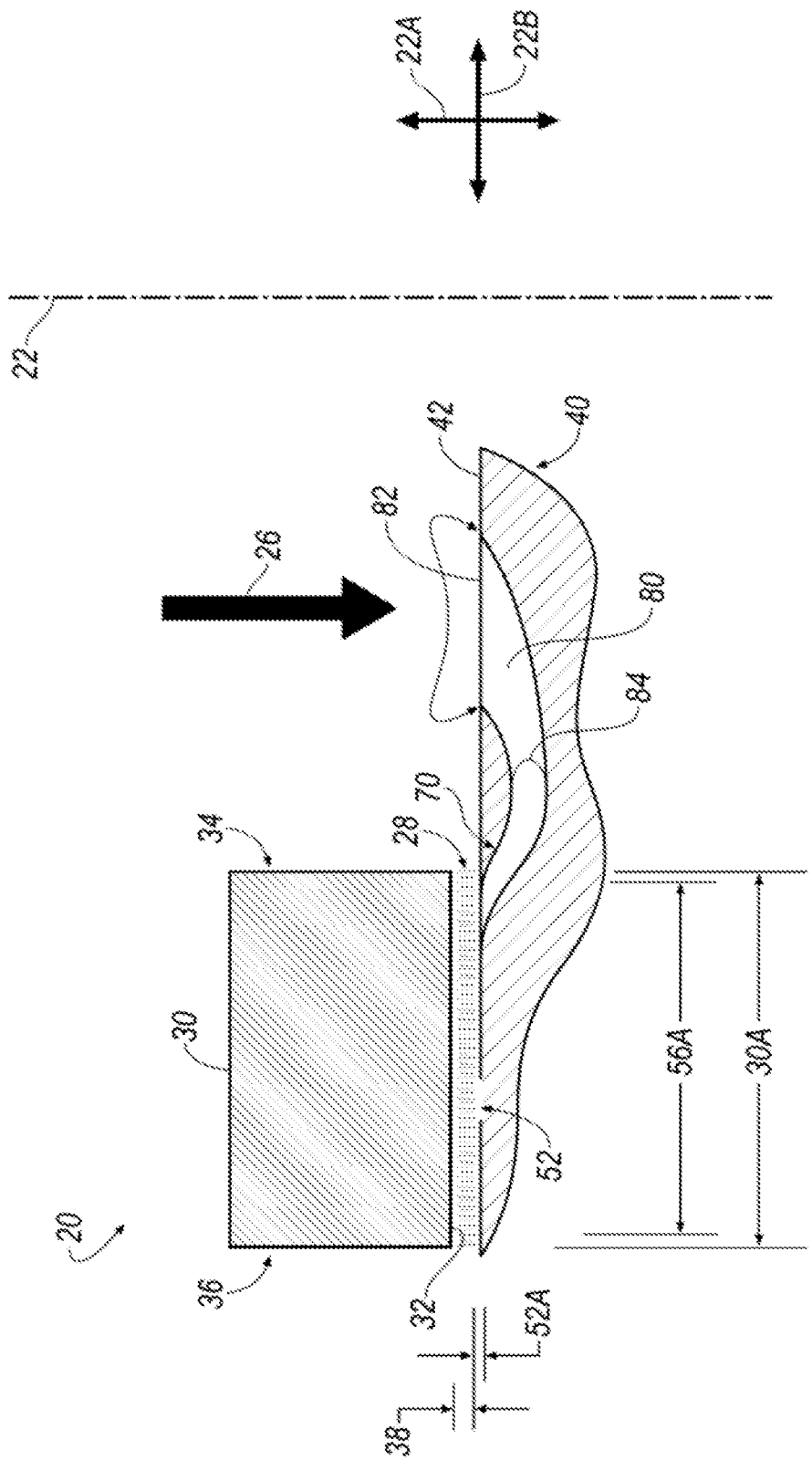
FIG. 2 is a partial cross-sectional view of the mating ring of FIG. 1, viewed along A-A, illustrated with an embodiment of a seal ring embodying teachings of the present disclosure.

Referring to FIGS. 1 and 2, a seal assembly 20 may include a first ring 30 and a second ring 40. The first ring 30, which may also be referred to as a seal ring 30, may be stationary in terms of rotation, but for applications may be permitted to move in the axial direction 22A—e.g., along a central axis 22. An axial/sealing face 32 of the seal ring 30 may be disposed adjacent the axial/sealing face 42 of a second ring 40. In embodiments, an axial face 32 may be a flat lapped face, and may be substantially flat.

In embodiments, second ring 40, which may also be referred to as a mating ring 40 or rotor 40, may be configured to rotate about central axis 22 (e.g., with shaft 24). Second ring 40 may include axial face 42, an inner diameter 44, an inner diameter surface 46, an outer diameter 48, an outer diameter surface 50, a groove 52, a dam 54, an inlet conduit 70, and/or an impeller portion 80. With embodiments, axial face 42 of rotating second ring 40 may include a relatively hard face coating and/or material with respect to the material of the first ring 30.

In embodiments, axial face 42 may include groove 52, which may include a single groove or a plurality of grooves, where each groove of the plurality of grooves may have characteristics such as those described in further detail herein. In embodiments, grooves 52 may include a depth 52A that may be configured to generate a hydrodynamic force. Groove depths 52A may vary, for example, and without limitation, from 150 to 900 micro-inches. A dam 54 may be disposed at or near the ends of the grooves 52 somewhere along the axial face 42 of second ring 40. The dam 54 can facilitate the compression of a fluid, such as a gas (e.g., air), which can result in a pressure increase in and/or near the groove 52 of second ring 40. The increase in the pressure may cause axial face 42 of second ring 40 to separate by a distance 38 from a corresponding/mating surface of an adjacent component, such as axial face 32 of first ring 30 (e.g., at least one of first ring 30 and second ring 40 may move away from the other). This distance/separation 38 may be slight, such as, for example, on the order of around 100 to 600 micro-inches. Seal leakage may occur across dam 54 and may be relatively minimal because distance 38 between the axial faces 32, 42 may be relatively small.

In embodiments, grooves 52 may be disposed in a sealing portion 56 of axial face 42. In embodiments, sealing portion 56 may be defined by a first intermediate diameter 58 of second ring 40 and a second intermediate diameter 60 of second ring 40, and/or may include a radial extent 56A. For example, and without limitation, grooves 52 may extend generally radially between first intermediate diameter 58 and second intermediate diameter 60. First intermediate diameter 58 may be disposed radially inward of second intermediate diameter 60, and first and second intermediate diameters 58, 60 of second ring 40 may correspond, respectively, to an inner diameter 34 and an outer diameter 36 of first ring 30. In embodiments of a seal assembly 20, first ring 30 may be disposed such that first ring 30 covers some or all of grooves 52 of second ring 40 in radial direction 22B and/or in a circumferential direction 22C. For example, and without limitation, a distance/radial extent 30A between inner diameter 34 and outer diameter 36 may be greater than With such configurations, first ring 30 may effectively cover and/or seal off grooves 52 in such a way that system fluid 26 may not enter grooves 52 directly. Instead, grooves 52 may be in indirect fluid communication with system fluid 26 via inlet conduits 70 and/or impellers 80.

An inlet conduit 70 may be configured to provide fluid communication between a groove 52 and an impeller portion 80, and may be disposed partially or entirely below axial face 42. Inlet conduit 70 may be configured such that it does not compress fluid 26 that travels through inlet conduit 70. For example, and without limitation, inlet conduit 70 may include a generally constant cross-sectional area. In embodiments, inlet conduits 70 may be configured to help maintain the momentum of flowing fluid 26. For example, and without limitation, inlet conduits 70 may be generally aligned with (e.g., may include a central axis that is generally parallel to central axes of) outlets 84 of impeller portions 80, which may allow flowing fluid 26 to continue to flow from impeller portions 80 into inlet conduits 70 without a significant change in direction. In an axial configuration of an impeller portion 80, described in greater detail below, inlet conduits 70 may be generally aligned with (e.g., parallel to) the radial direction 22B. In a radial configuration of an impeller portion 80, also described in greater detail below, inlet conduits 70 may be disposed at an angle, which may be an oblique angle, relative to the radial direction 22B.

With embodiments, to improve (e.g. increase) the volume, pressure, and/or rate of the fluid 26 (e.g., gas) entering grooves 52, such to create a fluid film 28, second ring 40 may include one or more impeller portions 80. An impeller portion 80 may include an inlet 82 and/or an outlet 84. Inlet 82 may be configured to receive system fluid 26 and an outlet 84 may be configured for fluid connection/communication with an inlet conduit 70. Impeller portion 80 may help maintain a sufficient fluid film 28 between first and second rings 30, 40 to reduce/prevent wear. In embodiments, a second ring 40 may include an impeller portion 80 for each groove 52. In such embodiments, each impeller portion 80 may be configured to improve the volume, pressure, and/or flow rate of fluid 26 for a respective groove 52. In embodiments, an impeller portion 80 may correspond to (e.g., be in fluid communication with) with a plurality of inlet conduits 70 and/or grooves 52. In embodiments, a plurality of impeller portions 80 may correspond to the same inlet conduit 70 and/or the same groove 52.

As generally illustrated in the figures (see, e.g., FIG. 3A), each impeller portion 80 may be configured to provide fluid to a respective inlet conduit 70 and groove 52 pairing, and one or more of the impeller inlets 82 may not overlap radially with the groove 52 to which the impeller portion 80 is intended to provide fluid 26. For example, and without limitation, the circumferential position of impeller inlet 82' may be offset by a distance (e.g., distance 86) from the circumferential position of groove 52'. In embodiments, an inlet 82 of an impeller portion 80 may be disposed ahead of a corresponding groove 52 relative to a direction of rotation of second ring 40. For example, and without limitation, as generally illustrated in FIG. 3A, the direction of rotation of second ring 40 may be a counterclockwise direction 22E and inlet 82' of impeller portion 80 may be disposed ahead of corresponding groove 52' in the counterclockwise direction 22E.

In embodiments, a circumferential length 82A of an impeller inlet 82, 82' may correspond to the number of impeller portions 80 and/or the number of grooves 52 of second ring 40. Impeller inlets 82, 82' may be configured such that each has a given length—e.g., the largest circumferential length 82A possible that also allows for a desired circumferential length 90A of a land 90 between each impeller portion 80. In embodiments, the circumferential length 82A of an impeller inlet 82 may be significantly greater than the width 52B of the grooves 52, which may include the circumferential length 82A of an impeller inlet 62 being three or four or more times larger than the width 52B of the grooves 52.

In embodiments, impeller portions 80 may be configured to help maintain the momentum, of flowing system fluid 26 and/or minimize flow disturbances (e.g., sharp turns), which may help maintain a fluid film 28 between first and second rings 30, 40. For example, and without limitation, as generally illustrated in FIGS. 1 and 2, in embodiments in which system fluid 26 is directed generally along an axial direction 22A substantially aligned with central axis 22, an axial configuration of impeller portion 80 may include an impeller inlet 82 being disposed at axial face 42. An impeller inlet 82 disposed at axial face 42 may receive fluid 26 and gradually alter the path of the fluid 26 as fluid 26 moves toward an inlet conduit 70 and ultimately to a groove 52. In an axial configuration, impeller portion 80 and/or inlet conduit 70 may be disposed radially inward of grooves 52.

Figure 3A:
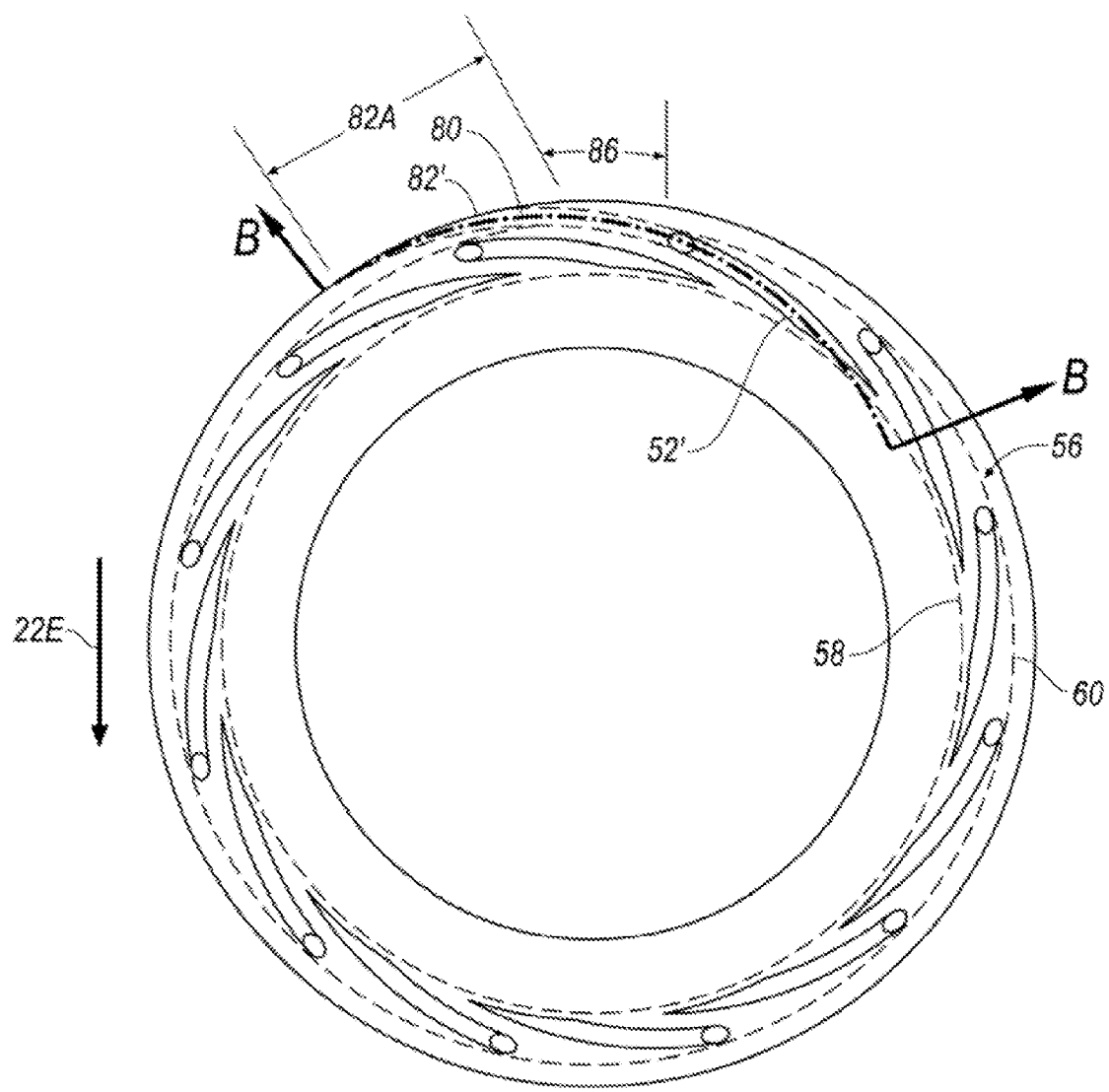
FIG. 3A is a front view of an embodiment of a mating ring embodying teachings of the present disclosure.
Figure 3B:
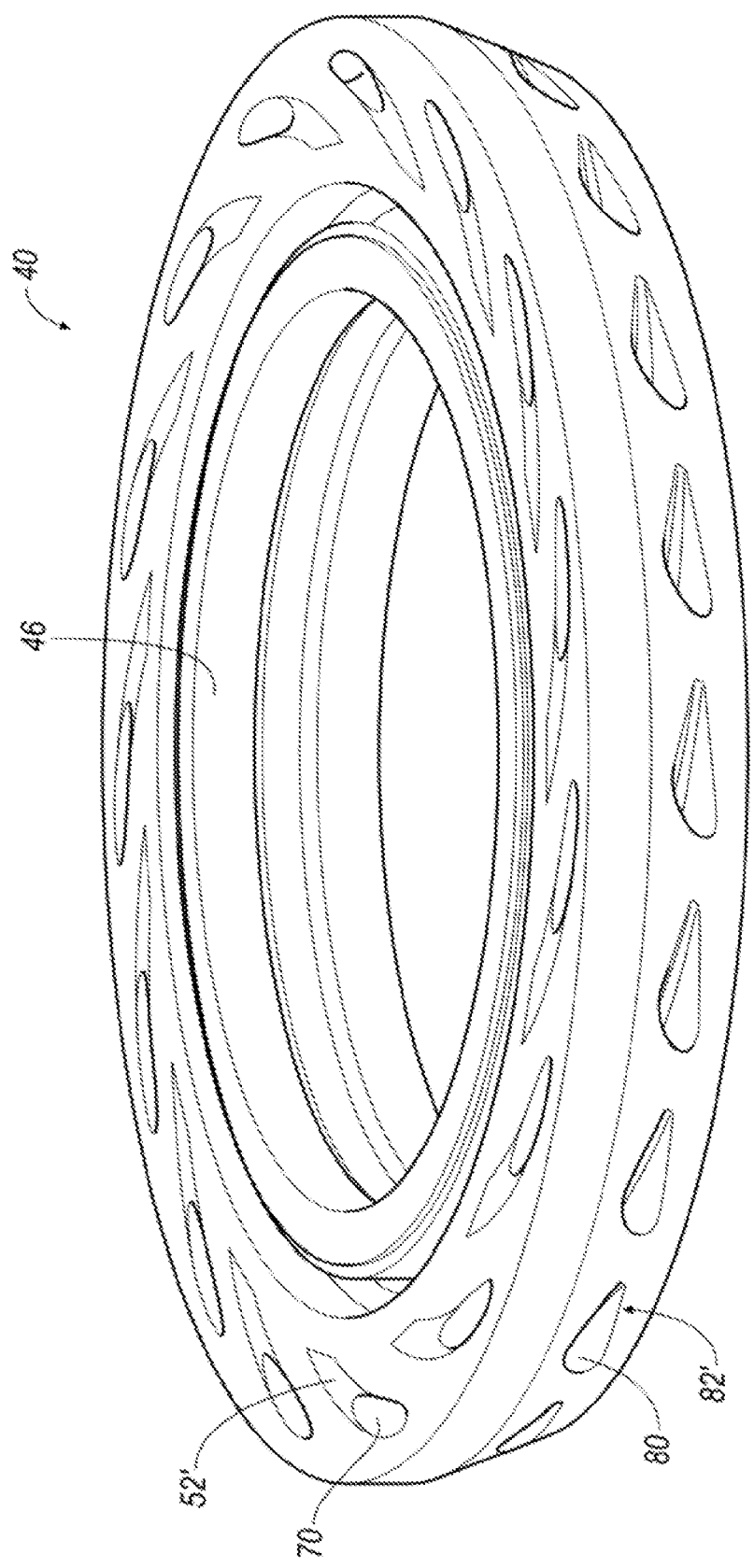
FIG. 3B is a perspective view of an embodiment of a mating ring embodying teachings of the present disclosure.
Figure 4:
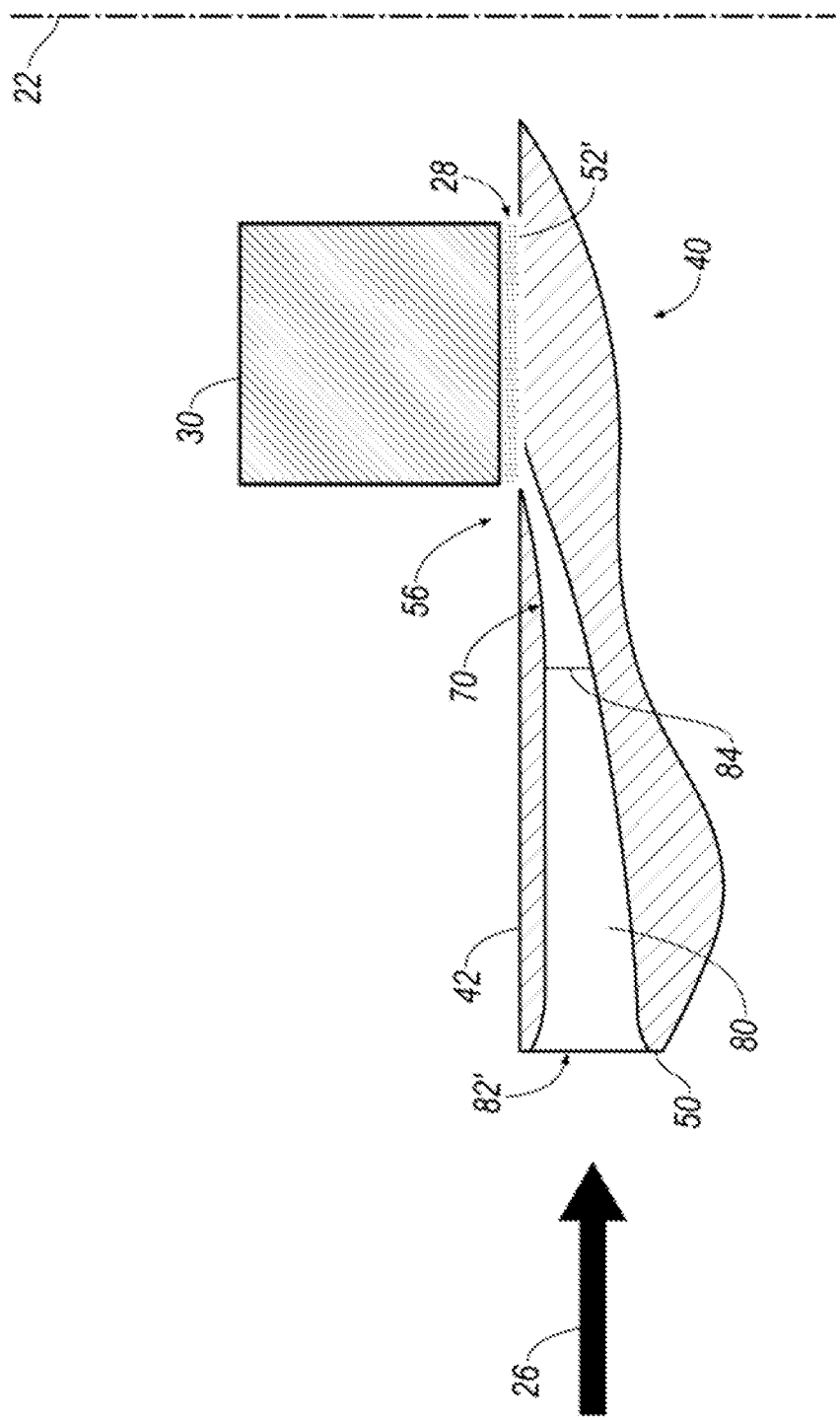
FIG. 4 is a partial cross-sectional view of the mating ring of FIG. 3A and FIG. 3B, viewed along B-B, illustrated with an embodiment of a seal ring embodying teachings of the present disclosure.

As generally illustrated in FIGS. 3A, 3B, and 4, in other embodiments, in which system fluid 26 is provided in the radial direction 22B relative to central axis 22 (e.g., at outer diameter surface 50), a radial configuration of an impeller portion 80 may include the inlet 82 of impeller portion 80 being disposed at outer diameter surface 50 of second ring 40. Inlet 82 in a radial configuration of impeller portion 80 may extend generally in the axial direction 22A and the circumferential direction 22C, and impeller portion 80 may extend generally radially inward toward inlet conduit 70. In a radial configuration, impeller portion 80 and/or inlet conduit 70 may be disposed radially outward of grooves 52.

In embodiments, the shape of the impeller portion 80 may be configured to receive system fluid 26, compress the received fluid 26, and convey the compressed fluid 26 to inlet conduit 70. As generally illustrated in FIG. 2, in an axial configuration, an impeller inlet 82 may include a relatively large cross-sectional area and/or perimeter (e.g., relatively large radial and/or circumferential dimensions at axial face 42), and the cross-sectional area and/or perimeter of impeller portion 80 may decrease as the impeller portion 80 extends radially outward and axially inward within second ring 40 to connect with inlet conduit 70. As generally illustrated in FIG. 4, in a radial configuration, an impeller inlet 82 may include a relatively large cross-sectional area and/or perimeter at outer diameter 48 and/or inlet 82, and the cross-sectional area and/or perimeter of impeller portion 80 may decrease as impeller portion 80 extends radially inward toward its outlet 84. A decreasing cross-sectional area of impeller portion 80 (e.g., from inlet 82 to outlet 84) may permit impeller portion 80 to compress fluid 26 that enters impeller portion 80 (e.g., at axial face 42 or outer diameter surface 50) as fluid 26 moves toward inlet conduit 70.

In embodiments, impeller portion 80 may be configured to take advantage of relative rotation between first ring 30 and second ring 40. Impeller portion 80 may be shaped to correspond to a direction of rotation, such that rotation of first ring 30 relative to second ring 40 may permit impeller portion 80 to draw fluid 26 in the vicinity of impeller portion 80 into impeller portion 80. Impeller portion 80 may draw in fluid 26 even if fluid 26 is not otherwise directed toward impeller portion 80 (e.g., if fluid 26 is not flowing toward impeller portion 80 and/or if fluid 26 is not sufficiently pressurized). In such a configuration, impeller portion 80 may transfer energy from the rotation of the first and second rings 30, 40 to the fluid 26, which may be in the form of increasing flow rate (e.g., kinetic energy) and/or increasing fluid pressure (e.g., potential energy). Increasing the energy of fluid 26 may help generate sufficient hydrodynamic force to maintain sealing film 28 between the first and second rings 30, 40. For example, in low pressure (e.g., high altitude) and/or low rotational speed conditions, fluid 26 may not be sufficiently pressurized and/or may not be flowing at a sufficient rate on its own to generate a sufficient fluid film 28 between first and second rings 30, 40 to keep first and second rings 30, 40 apart. In such low pressure and/or low rotational speed conditions, impeller portion 80 may draw and/or scoop in a sufficient amount of fluid 26 and/or sufficiently compress fluid 26 (e.g., as a result of impeller portion geometry) such that fluid film 28 is maintained between the first and second rings 30, 40.

In embodiments, an impeller portion 80 may comprise one or more of a variety of shapes, sizes and/or configurations. In embodiments, a second ring 40 may comprise a plurality of impeller portions 80, at least one of which may include a different shape, size, and/or configuration than another of the plurality of impeller portions 80. Impeller portions 80 may be customized according, to an intended environment (e.g., expected pressure conditions/altitudes, expected rotational speeds, expected flow rates, etc.).

Figure 5:
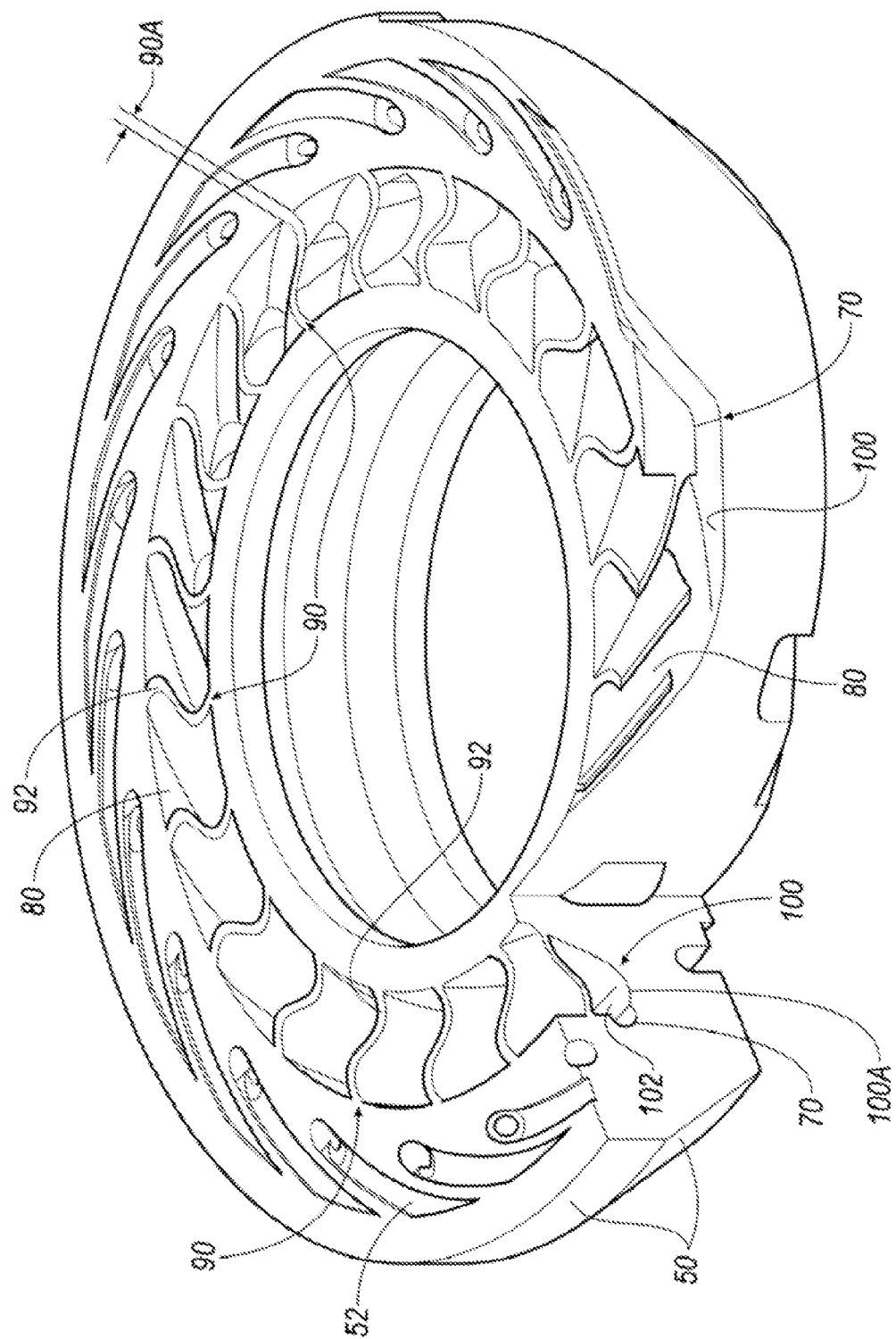
FIG. 5 is a partial perspective and cross-sectional view of an embodiment of a mating ring embodying teachings of the present disclosure.
Figure 6:
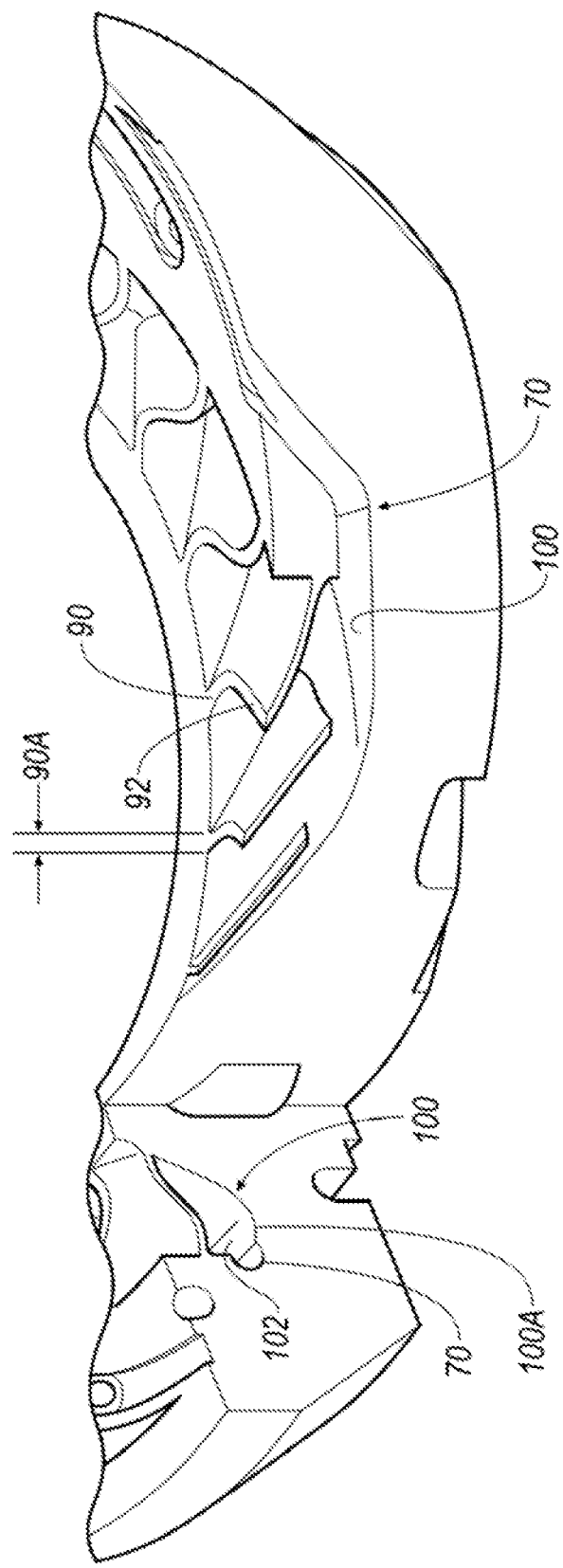
FIG. 6 is a partial perspective and cross-sectional view of an embodiment of a mating ring embodying teaching of the present disclosure.
Figure 7:
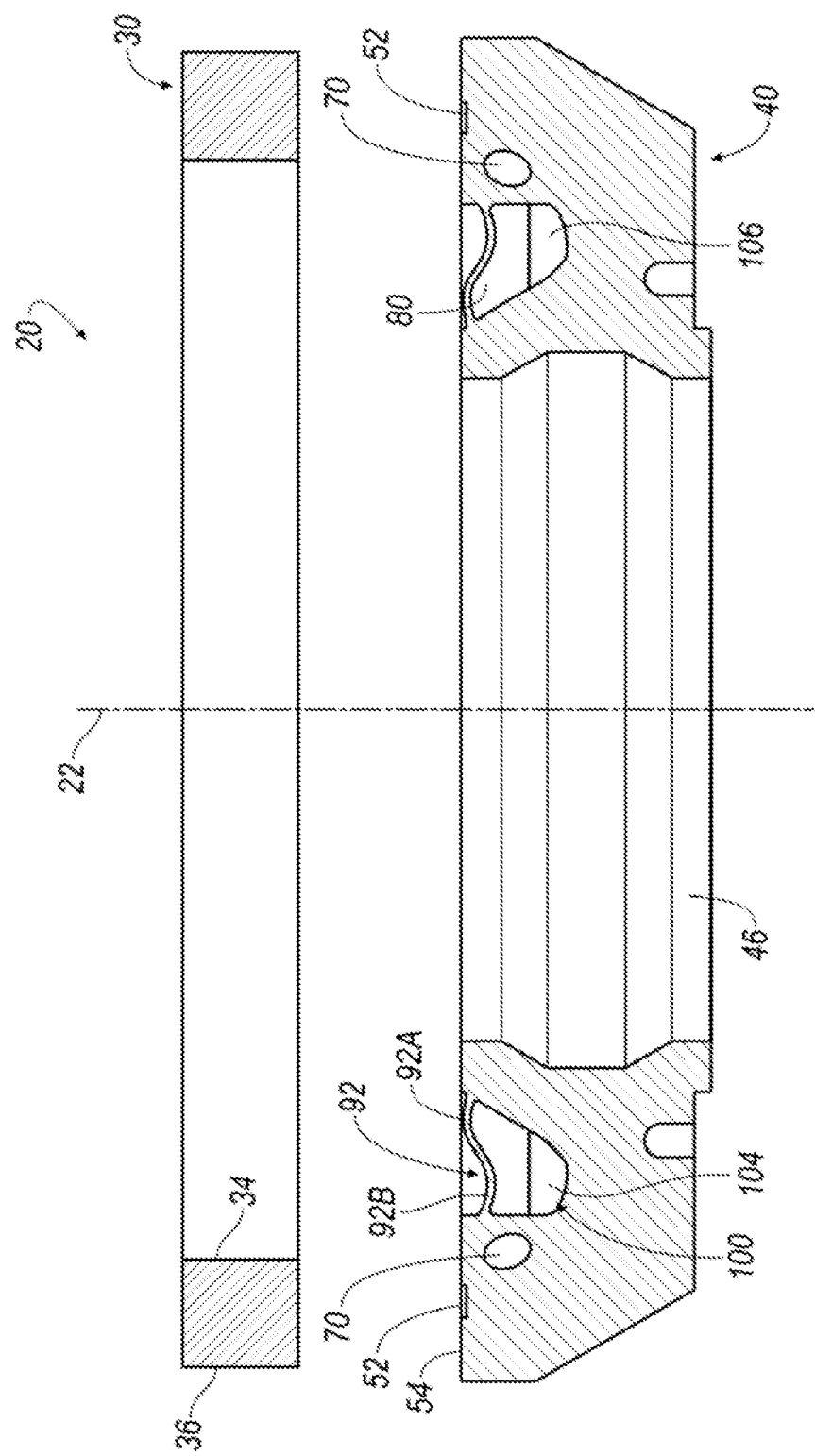
FIG. 7 is a cross-sectional view of an embodiment a mating ring and a seal ring in accordance with teachings of the present disclosure.

As generally illustrated in FIG. 1, an embodiment of an impeller portion 80 may include a generally rectangular shape that may include a convex edge and/or a concave edge. A concave edge may be a leading edge relative to an intended direction of rotation. As generally illustrated in FIGS. 5 and 6, a top portion 92 of a land 90 may generally be disposed at or near, and/or be generally flush with axial face 42. In embodiments, as generally illustrated in FIG. 7, a top portion 92 of a land 90 may be generally curved with respect to the axial direction 22A. A curved impeller top portion 92 may include a first section 92A of top portion 92 being disposed generally flush with axial face 42 and a second section 9213 of top portion 92 being disposed axially offset from (e.g., below or above) axial face 42.

In embodiments, a land 90 may separate adjacent impeller portions 80. As generally illustrated in FIG. 1, lands 90 may be about the same size and/or shape as the impeller portions 80. As generally illustrated in FIGS. 5-6, lands 90 between adjacent impeller portions 80 may be relatively thin compared to the circumferential length/extent 82A of impeller portions 80 (e.g., the circumferential extent 90A of the lands 90 may be half or less of the circumferential extent 80A of the impeller portions 80). Also as generally illustrated in FIGS. 5-6, impeller portions 80 may be angled relative to the axial direction 22A (e.g., planes defined by the axial and radial directions) and/or may be angled toward a direction of intended rotation. For example, and without limitation, for a second ring 40 with an intended rotation in the clockwise direction 22D, impeller portions 80 and/or land top portions 92 may be angled toward the clockwise direction 22D.

Figure 5A:
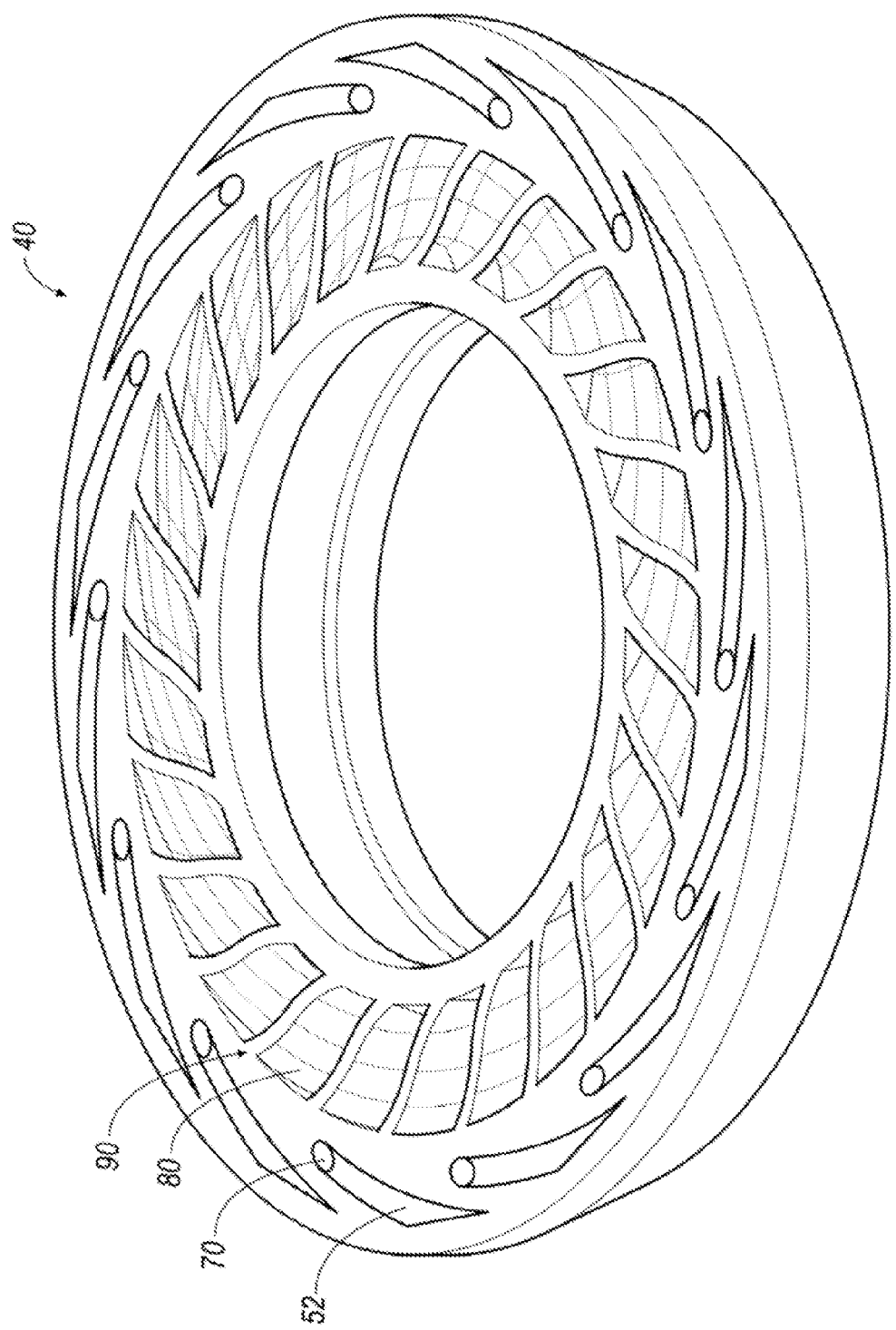
FIGS. 5A-5E are perspective views of embodiments of mating rings embodying teachings of the present disclosure.
Figure 5B:
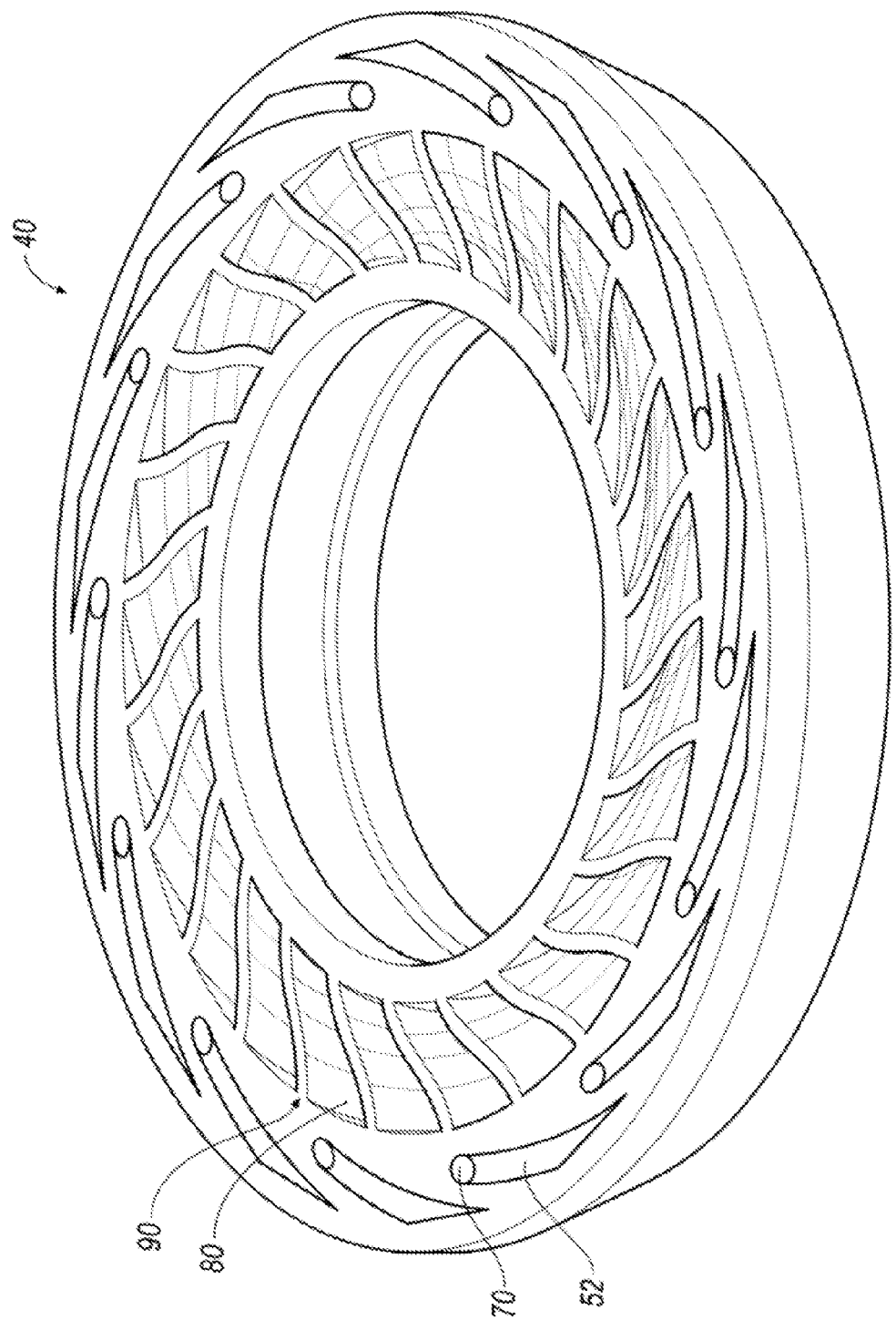

In embodiments, impeller portions 80 may include a portion having a generally wavy configuration/shape (see, e.g., FIGS. 5, 5A, and 5B). A wavy shape may correspond to lands 90 including a wavy shape relative to the radial direction 22B. In embodiments, such as generally illustrated in FIG. 5, impeller portions 80 may include a neutral configuration, in which lands 90 may be generally aligned with the radial direction 22B. In embodiments, such as generally illustrated in FIG. 5A, impeller portions 80 may include a leading configuration, in which lands 90 may be angled such that radially outer portions of lands 90 are circumferentially ahead (e.g., in a direction of rotation) of radially inner portions of lands 90. In embodiments, such as generally illustrated in FIG. 5B, impeller portions 80 may include a trailing configuration, in which lands 90 may be angled such that radially outer portions of lands 90 are circumferentially behind (e.g., in a direction of rotation) radially inner portions of lands 90.

Figure 5C:
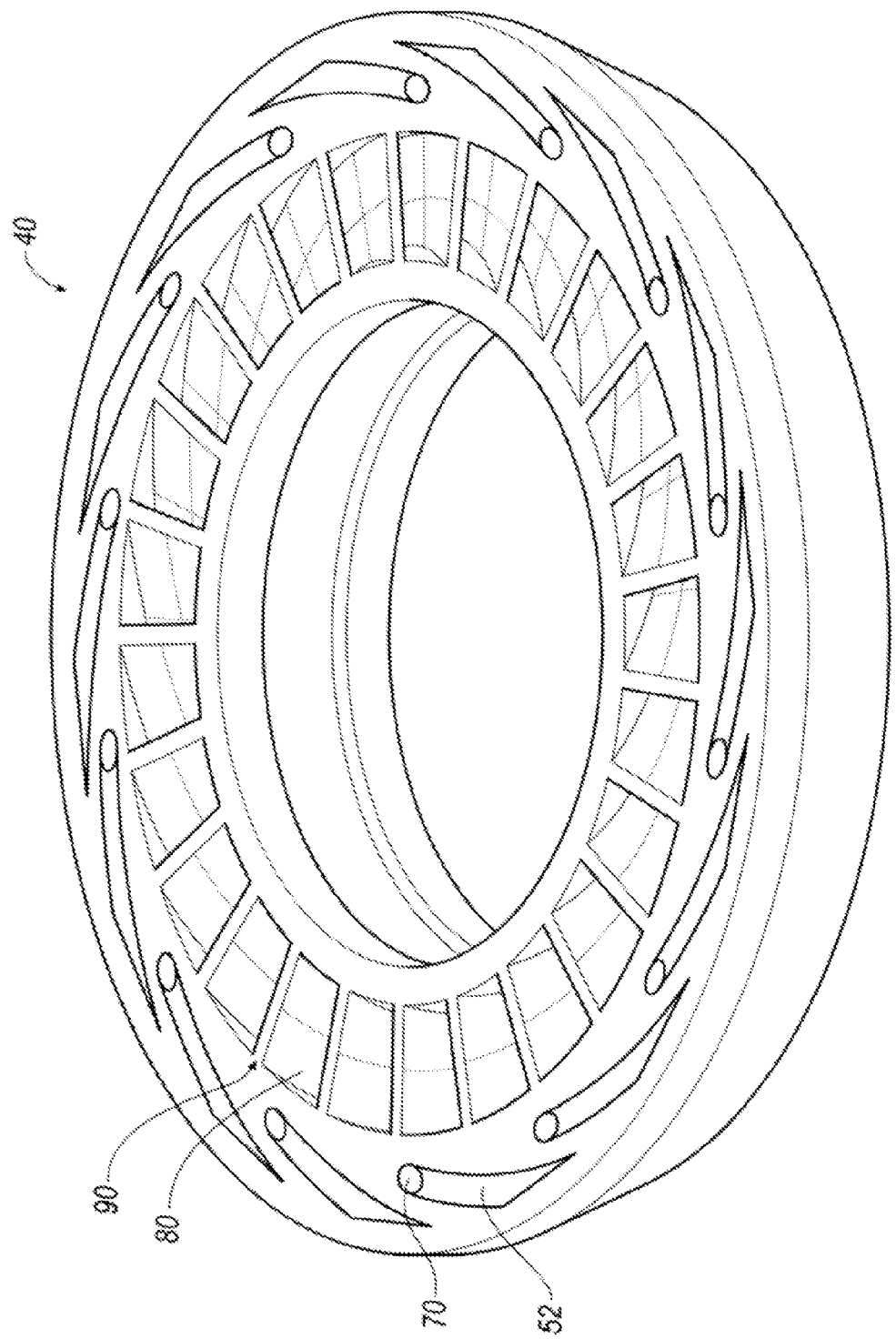

In embodiments, impeller portions may include a generally rectangular configuration/shape, such as generally illustrated in FIG. 5C, which may correspond to lands 90 being generally aligned with the radial direction. Rectangular-shaped impeller portions 80 may include a neutral, trailing, and/or leading configuration.

Figure 5D:
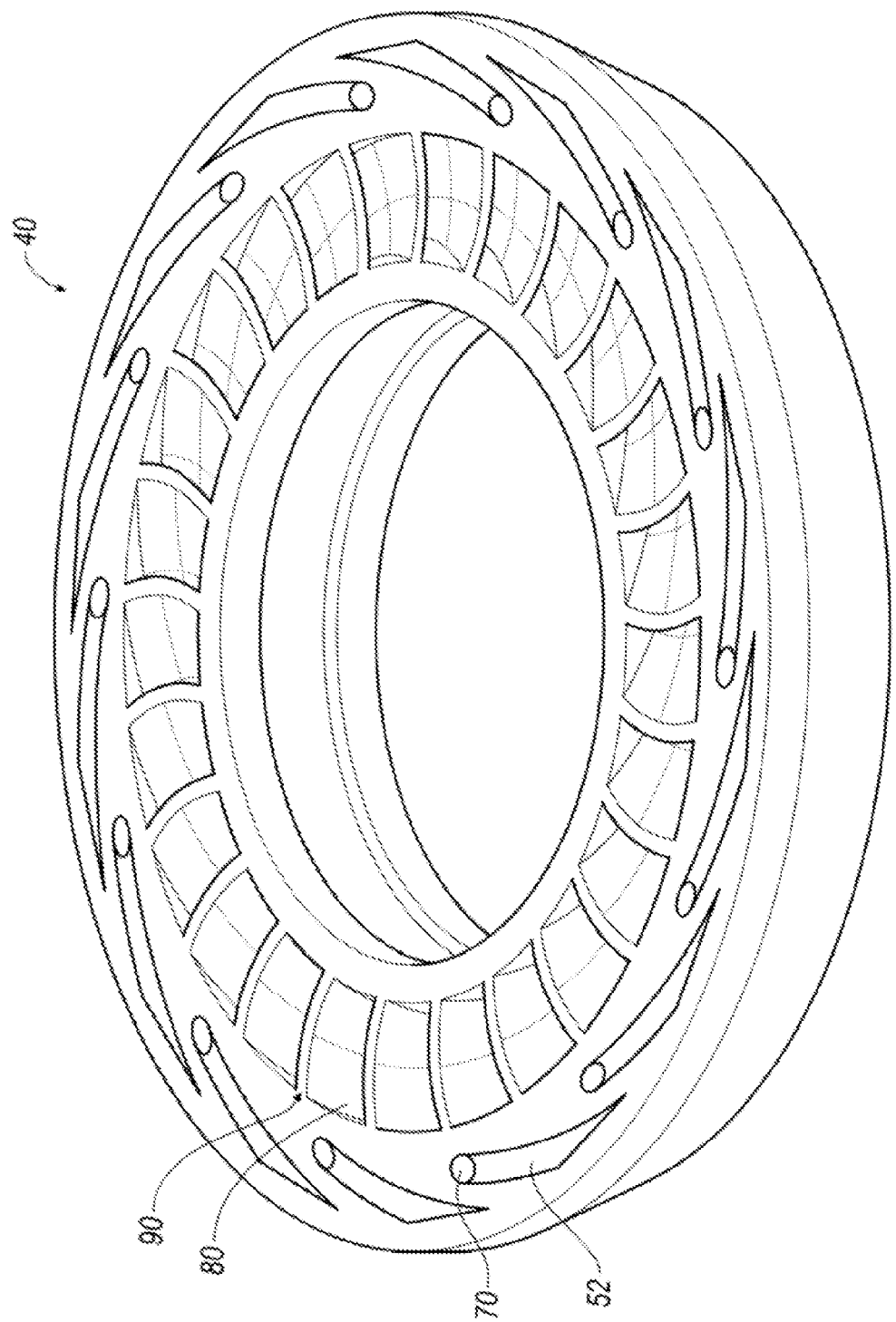

In embodiments, impeller portions 80 may include a generally convex configuration/shape, such as generally illustrated in FIG. 5D, which may correspond to lands 90 being curved in the direction of anticipated rotation (e.g., curved in the clockwise direction). Convex-shaped impeller portions 80 may include a neutral, trailing, and/or leading configuration.

Figure 5E:
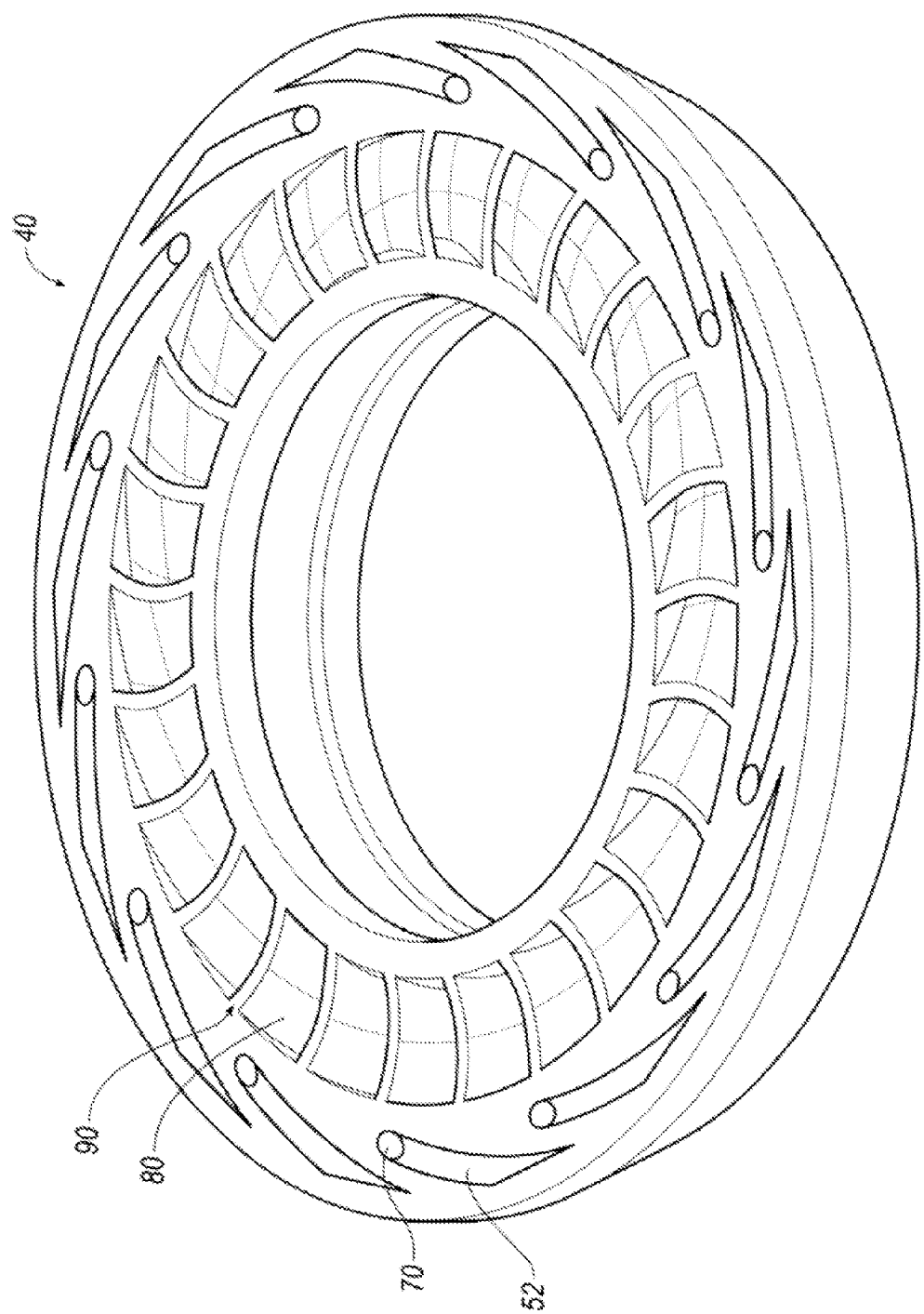

In embodiments, impeller portions may include a generally concave configuration/shape, such as generally illustrated in FIG. 5E, which may correspond to lands 90 being curved in the direction opposite of anticipated rotation (e.g., curved in the counterclockwise direction). Concave-shaped impeller portions 80 may include a neutral, trailing, and/or leading configuration.

In embodiments, the circumferential length/extent 90A of lands 90 may vary across their axial lengths. For example, and without limitation, the circumferential length 90A of lands 90 may be the smallest at or near axial face 42 and may increase as lands 90 extend generally axially inward (e.g., farther below axial face 42).

In embodiments, such as generally illustrated in FIGS. 5, 6, and 7, second ring 40 may include a buffer 100 that may be configured to dampen the effects of variations in system fluid pressure. Buffer 100 may be configured to accumulate or store system fluid 26 received by impeller portions 80 so that in the event of a change in system fluid characteristics (e.g., pressure, flow rate, etc.), accumulated or stored fluid 26 in buffer 100 may be provided to grooves 52 via inlet conduits 70 to maintain the film 28 between first and second rings 30, 40.

Buffer 100 may comprise one or more of a variety of shapes, sizes, and/or configurations. Buffer 100 may include a fluid chamber 102 disposed under axial face 42 and/or may extend generally circumferentially about second ring 40 relative to central axis 22. Chamber 102 may extend circumferentially along part and/or all of second ring 40. In embodiments, chamber 102 may include a single continuous chamber, or chamber 102 may include a plurality of chamber sections (e.g., chamber sections 104, 106). A plurality of chamber sections may include sections of generally the same size, shape, and configuration or at least one of the sections may be different from the at least one other section. In embodiments, buffer 100 may include first chamber section 104 and second chamber 106, and first section 104 may include a relatively small volume with respect to second section 106.

Buffer 100 may be disposed in a fluid path between impeller portions 80 and inlet conduits 70 and/or may provide fluid communication between impeller portions 80 and inlet conduits 70. In embodiments, impeller portions 80 may not be in direct fluid communication with inlet conduits 70, but may instead be in indirect fluid communication with inlet conduits 70 via buffer 100.

In embodiments, the volume associated with buffer 100 may correspond to a desired behavior of second ring 40. For example, and without limitation, in embodiments, variations in external conditions (e.g., system pressure) may typically occur relatively quickly, but may last for a relatively short period of time. For such quick and short variations, it may be desirable for the volume of buffer 100 to be relatively small so that buffer 100 is able to quickly respond to the variations. For embodiments in which variations occur relatively slowly, but may last for a relatively long period of time, it may be desirable for the volume of buffer 100 to be relatively large so that grooves 52 may be supplied with fluid 26 from buffer 100 for a longer or extended period of time. In embodiments, the volume of buffer 100 may be greater than the collective volumes of all of the inlet conduits 70. In embodiments, buffer 100 may include a portion 100A disposed axially inward of (e.g., further below axial face 42 than) inlet conduit 70.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed:

1. A hydrodynamic mating ring comprising:
   an axial sealing face;
   a plurality of spaced apart hydrodynamic grooves disposed in the sealing face;
   a plurality of spaced apart impeller portions recessed into the sealing face; and
   a plurality of inlet conduits, each inlet conduit respectively connecting one of the hydrodynamic grooves to one of the impeller portions and configured to provide fluid communication therebetween during rotation of the mating ring,
wherein each of the inlet conduits is disposed completely beneath the axial sealing face, and each of the inlet conduits is an enclosed passage only open at the hydrodynamic groove and the impeller portion to which each inlet conduit is respectively connected.

2. The hydrodynamic mating ring of claim 1, wherein a buffer is disposed beneath the sealing face and is in fluid communication with at least one of the impeller portions and at least one of the inlet conduits.

3. The hydrodynamic mating ring of claim 1, wherein the impeller portions each include an inlet and an outlet, and a cross-sectional area of each of the impeller portions decreases from the respective inlet to the respective outlet.

4. The hydrodynamic mating ring of claim 1, wherein each impeller portion is configured to receive fluid from an axial direction.

5. The hydrodynamic mating ring of claim 1, wherein each impeller portion is disposed circumferentially ahead of the hydrodynamic groove.

6. The hydrodynamic mating ring of claim 1, comprising a buffer, the buffer comprising a single circumferential chamber disposed beneath the sealing face and in fluid communication with each of the plurality of impeller portions and each of the plurality of inlet conduits.

7. The hydrodynamic mating ring of claim 1, wherein each of the impeller portions, upon rotation of the mating ring, draws in fluid and increases a volume, pressure, or a flow rate of said fluid.

8. The hydrodynamic mating ring of claim 1, wherein a plurality of lands are disposed circumferentially between respective adjacent ones of the plurality of impeller portions.

9. The hydrodynamic mating ring of claim 8, wherein at least one of the lands includes a wavy configuration.

10. The hydrodynamic mating ring of claim 8, wherein at least one of the lands includes a concave configuration or a convex configuration.

11. The hydrodynamic mating ring of claim 8, wherein at least one of the lands includes a trailing configuration or a leading configuration.

12. The hydrodynamic mating ring of claim 8, wherein at least one of the lands includes a generally rectangular shape.

13. The hydrodynamic mating ring of claim 1, wherein each of the impeller portions is a generally rectangular shape.

14. A method of sealing, the method comprising:
providing a mating ring comprising:
an axial sealing face;
a plurality of spaced apart hydrodynamic grooves disposed in the sealing face;
a plurality of spaced apart impeller portions recessed into the sealing face; and
a plurality of inlet conduits respectively connecting one of the hydrodynamic grooves to one of the impeller portions and configured to provide fluid communication therebetween, and wherein each of the inlet conduits is disposed completely beneath the axial sealing face, and each of the inlet conduits is an enclosed passage only open at the hydrodynamic groove and the impeller portion to which each inlet conduit is respectively connected;
rotating the mating ring; and
increasing at least one of a pressure, a volume, and a flow rate of fluid to the hydrodynamic grooves via the plurality of impeller portions drawing said fluid into the plurality of inlet conduits.

15. The method of claim 14, wherein the mating ring includes a buffer, the method comprising storing at least a portion of said fluid in the buffer.

16. The method of claim 15, wherein the buffer comprises a single circumferential chamber disposed beneath the sealing face and in fluid communication with each of the plurality of impeller portions and each of the plurality of inlet conduits.

17. The method of claim 15, comprising providing said fluid stored in the buffer to at least one of the plurality of inlet conduits in response to a change in external conditions.

18. The method of claim 14, wherein a plurality of lands are disposed circumferentially between respective adjacent ones of the plurality of impeller portions, and at least one of the lands includes a wavy leading configuration or a trailing wavy configuration.

19. The method of claim 14, comprising, compressing fluid in at least one of the impeller portions and providing the compressed fluid to a corresponding one of the inlet conduits.

20. The method of claim 14, wherein a plurality of lands are disposed circumferentially between respective adjacent ones of the plurality of impeller portions, and at east one of the lands includes a concave configuration or a convex configuration.

* * * * *